United States Patent
Kobayashi et al.

(10) Patent No.: US 6,351,266 B1
(45) Date of Patent: Feb. 26, 2002

(54) INFORMATION PROCESSING METHOD AND APPARATUS AND PROVIDING MEDIUM

(75) Inventors: Seiji Kobayashi; Shigeo Morishima, both of Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/325,891

(22) Filed: Jun. 4, 1999

(51) Int. Cl.⁷ .......................... G06T 11/20; G06T 11/60
(52) U.S. Cl. ........................................ 345/442; 345/630
(58) Field of Search ................................ 345/441–443, 345/435, 630

(56) References Cited

U.S. PATENT DOCUMENTS 5,404,426 A * 4/1995 Usami et al.
6,097,396 A * 8/2000 Rouet et al.

OTHER PUBLICATIONS

T. Yamana et al., "A Method of Hair Representation Using Anisotropic Reflection," PRU87–3, 1989, pp. 15–20.
S. Kobayashi et al., "Motion Model for Threadlike Objects and Its Simulation by Computer Graphics," PRU90–127, 1991, pp. 15–20.
K. Anjyo et al., "A Simple Method for Extracting the Natural Beauty of Hair," SIGGRAPH Jul. 1992, pp. 111–120.
Goldman, "Fake Fur Rendering", Aug. 3–8, 1997, Procedings of the 24th annual conference on Computer graphics & interactive techniques, pp. 127–134.*
Magenat Thalmann et al. "Virtual Clothes, Hair and Skin for Beautiful Top Models", 1996, Proceeding of Computer Graphics International, IEEE, pp. 132–141.*

* cited by examiner

*Primary Examiner*—Jeffery Brier
(74) *Attorney, Agent, or Firm*—Bell, Boyd & Lloyd LLC

(57) ABSTRACT

In computer graphics, the distal end of a hair being drawn is to be prevented from being lowered in massy feeling. To this end, a data storage unit stores three-dimensional coordinates of control points of a curve, and outputs these coordinate values to a curve approximating unit under control by a controller. The curve approximating unit generates a Bezier curve, using the coordinate values of the input control points, to output the generated Bezier curve to a z-coordinate comparator. The z-coordinate comparator stores the one of the coordinate values having the same x-components and y-components which is closest to a viewing point, that is, which has the maximum z-component. A reflected light intensity computing unit computes the intensity of the light reflected by the surface of the curve. An image synthesis unit mixes luminance values of a portion of the curve from an input pre-set position (tip) to the distal end of the hair (t=1) with luminance values of the background supplied from a frame buffer in a pre-set mixing ratio. An end setting unit sets the pre-set position (tip).

13 Claims, 7 Drawing Sheets

INFORMATION PROCESSING METHOD AND APPARATUS AND PROVIDING MEDIUM

BACKGROUND OF THE INVENTION

1. Field of the Invention

This invention relates to an information processing method and apparatus and a providing medium. More particularly, it relates to an information a processing method and apparatus and a providing medium in which, if the hair is to be represented by a curve, the end of the hair is mixed with the background to permit the hair end to be seen to have a fine size.

2. Description of the Related Art

For representing the human hair in the conventionally computer graphics, there are used a method of approximating the hair in its entirety using a polygonal model and bonding the texture of the hair on its surface, as shown in FIG. 1A, and a method of effecting lettering using an anisotropic reflection model exhibiting differential reflection intensity depending on different light source positions or different viewing point positions. These methods are described in Yamana and Suenaga, "Hair Representation Using Anisotropic Reflection Model" SHIN-GAKU GIHOU, PRU87-3, pp. 115 to 120, 1989.

However, with the above-mentioned method of approximating the hair style using the polygon model, it is difficult to represent a complex hair pattern, such as triple knitting hair pattern, or to represent hair movement.

As a method for modelling individual hairs, there are proposed a method of approximating a hair by a polygon model of a triangular pyramidal shape, and a method of approximating a sole hair by the combination of a large number of shorter line segments. These methods are described in K. Anjo, Y. Usami and T. Kurihara, "A Simple Method for Extraction of the Natural Beauty of Hair", Computer Graphics, vol. 26, pp. 111–1120, 1992.

However, the method of representing the sole hair using a polygon model of a triangular pyramidal shape is in need of voluminous data, while the fair thickness is increased to give an unnatural appearance. Moreover, with the method of approximating a sole hair using the combination of a large number of line segments, it is difficult to interconnect the numerous line segments smoothly.

As a method of overcoming the above-mentioned difficulties, there is proposed a method of specifying plural control points p1 to p7 and to generate parametric curves, such as Bezier curves or B-spline curves, from the coordinates of the control points, to approximate the hair. This method is disclosed in Kobayashi, Morishima and Harashima, "Motion Model of a Filamentary Body and CG Simulation" SHIN-GAKU GIHOU, PRU90-127, pp. 15 to 20, 1991.

However, the method of generating the Bezier curves or the B-spline curves for approximating the hair has a drawback that, since the hair thickness is perpetually constant from the root to the hair end, the massy feeling of the hair is lowered at the hair end.

SUMMARY OF THE INVENTION

It is therefore an object of the present invention to suppress the lowering of the massy feeling of the end of the hair by mixing the luminance value of the hair end with the luminance value of the background to permit the hair end to be seen as being of reduced thickness.

In one aspect, the present invention provides a information processing apparatus for drawing a filamentary object including means for storing a plurality of control points, means for generating a line from the control points stored in the storage means, means for specifying a portion of the line generated by the generating means, means for computing luminance values of the line portion specified by the specifying means and means for synthesizing luminance values of the line portion computed by the computing means and luminance values of the background.

In another aspect, the present invention provides an information processing method for drawing a filamentary object including a step for generating a line from a plurality of control points, a step for specifying a portion of the line generated by the generating step, a step for computing luminance values of the line portion specified by the specifying step and a step for synthesizing luminance values of the line portion computed by the computing step and luminance values of the background.

In yet another aspect, the present invention provides a providing medium for providing to an information processing apparatus for drawing a filamentary object a program designed to permit execution of processing including a step for generating a line from a plurality of control points, a step for specifying a portion of the line generated by the generating step, a step for computing luminance values of the line portion specified by the specifying step, and a step for synthesizing luminance values of the line portion computed by the computing step and luminance values of the background.

DESCRIPTION OF THE PREFERRED EMBODIMENTS

Figure 1A:
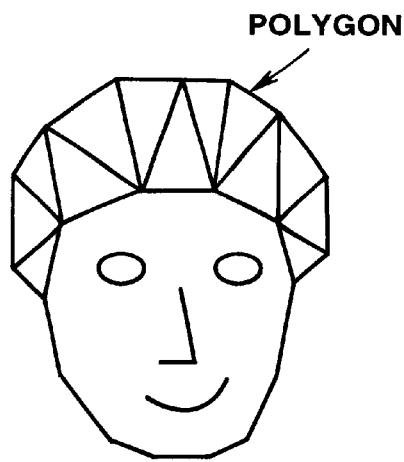
FIGS. 1A and 1B illustrate conventional computer graphics.

Referring to the drawings, preferred embodiments of the present invention will be explained in detail.

Figure 1B:
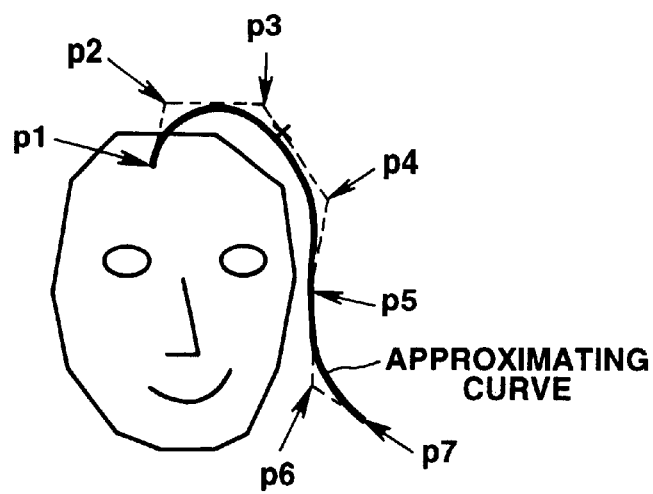
Figure 2:
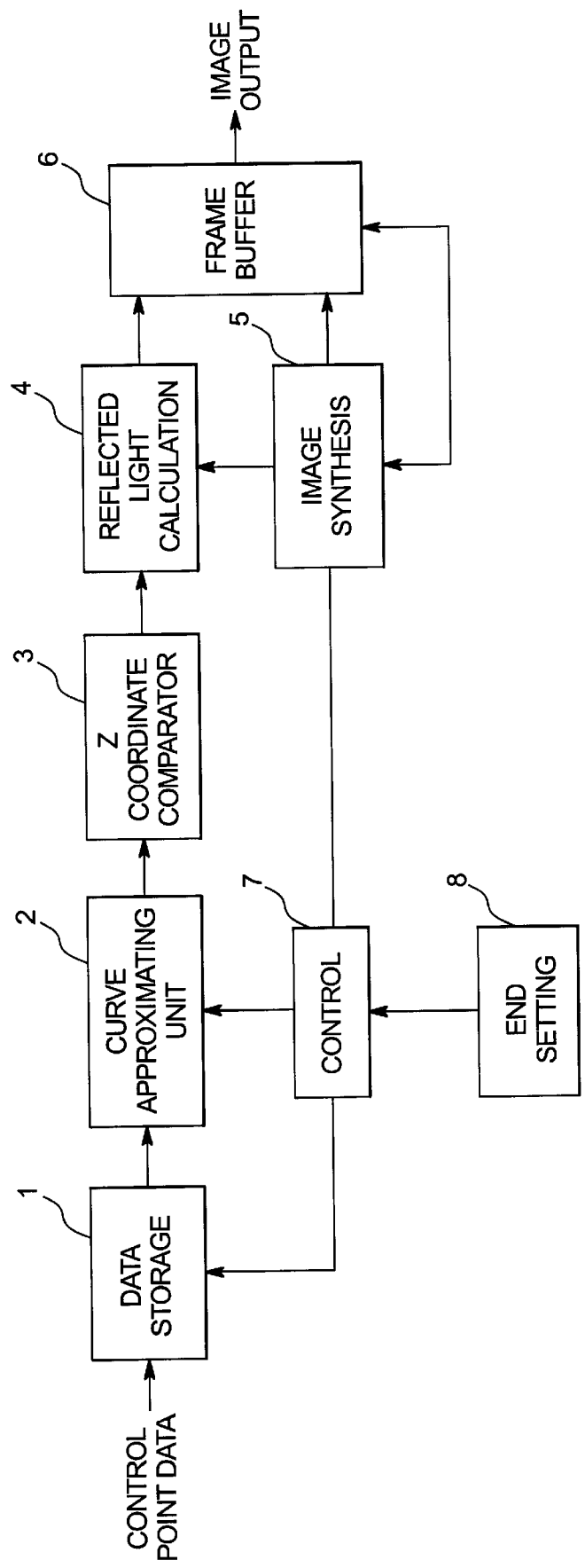
FIG. 2 is a block diagram showing the structure of an information processing apparatus embodying the present invention.

Referring first to FIG. 2, the structure of an information processing apparatus embodying the present invention will be explained in detail. A data storage unit 1 stores data of $n_{max}$ curves used for representing the hair in computer graphics and outputs the data to a curve approximating unit 2 under control by a controller 7. These curves may, for example, be Bezier curves and the data may consist of plural control points per curve, such as three-dimensional coordinates (x, y, z) of points p1 to p7 as shown in FIG. 1B.

The curve approximating unit 2 generates coordinates of the Bezier curve, using the coordinates of control points inputted from the data storage unit 1 and parameters t to output the generated coordinates to a z-coordinate comparator 3. Meanwhile, the parameters t are numbers of from 0 to 1, with the parameter t=0 and the parameter t=1 corresponding to the root and to the end of the curve, respectively.

The z-coordinate comparator 3 is designed to store one of the three-dimensional coordinates with the same x- and y-coordinates which lies closest to the viewing point, that is a point having the maximum z-component. The z-coordinate comparator 3 compares the z-component of the input three-dimensional coordinate with the z-component stored in itself and which is associated with the x- and y-components of the input three-dimensional coordinate. If the input z-component is larger than the z-component stored in itself, the z-coordinate comparator 3 updates the z-component of the coordinate stored in itself using the value of the input z-component.

A reflected light intensity computing unit 4 computes the intensity of the light reflected by the surface of the hair (Bezier curve), that is the luminance value at the point in question. The reflected light intensity computing unit 4 outputs to a frame buffer 6 the luminance value of a curve from the root of the curve (position of t=0 in FIG. 3) to pre-set position (position "tip" in FIG. 3), among the computed luminance values, and outputs the luminance values of the curve from the pre-set position (tip) to the end of the hair (position t=1 in FIG. 3) to an image synthesis unit 5.

The image synthesis unit 5 mixes the luminance value from the input pre-set position (tip) to the hair end (t=1) and the luminance value of the background supplied from the frame buffer 6, such as skin of the parietal, supplied from the frame buffer 6, in a pre-set ratio, by way of performing α-blending, to output the result to the frame buffer 6. The frame buffer 6 stores the input luminance value in association with a curve coordinate. The controller 7 manages control of the overall apparatus.

An end setting unit 8 sets a pre-set position (tip) on the curve using the parameter t. The pre-set position (tip) can be previously defined at the option of a user. That is, the user may set the "tip" to the same value, or set different values of the tip from one curve to another, such as by setting the value of the tip as a function of the lengths of the respective curves.

Figure 4:
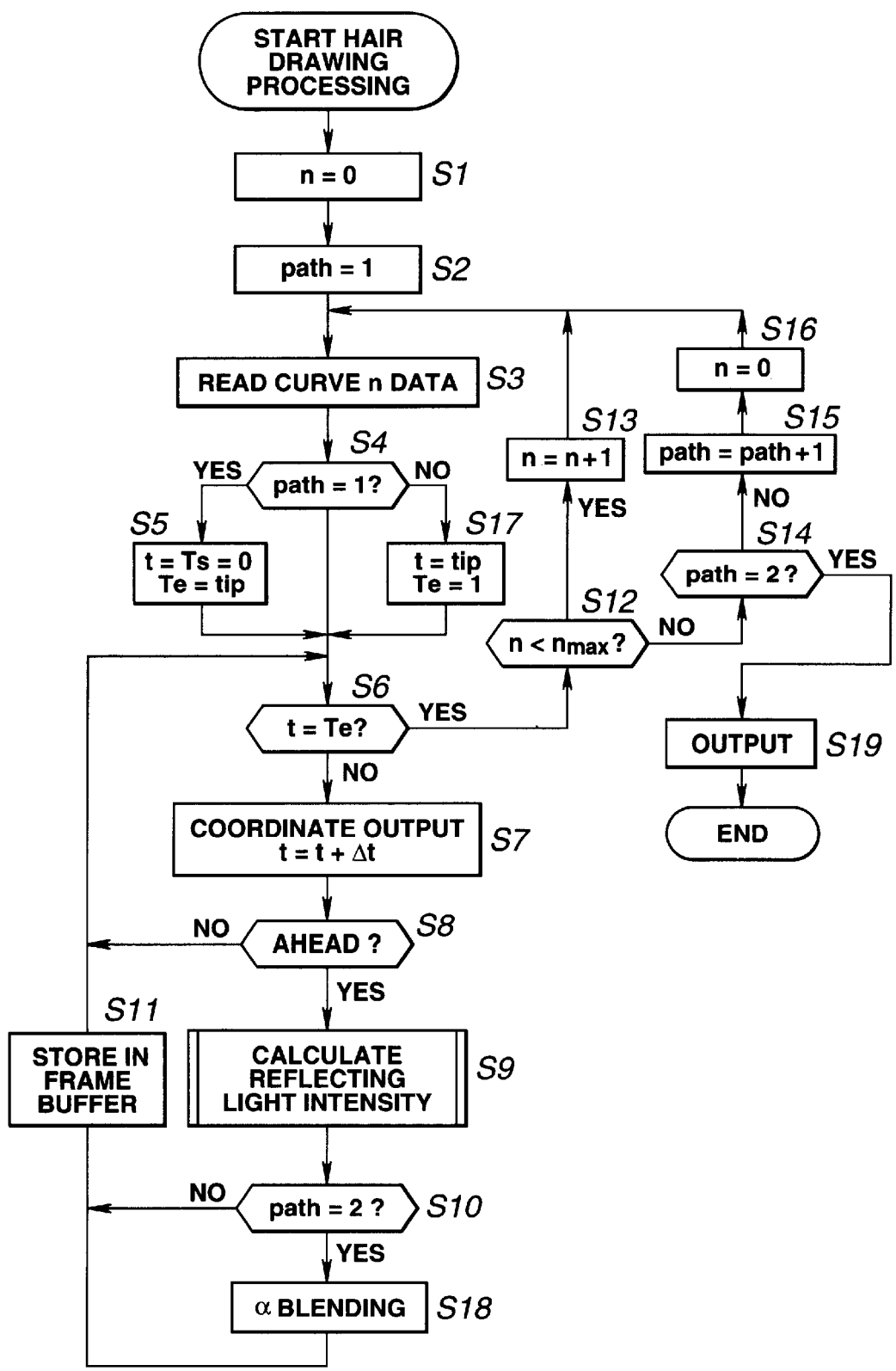
FIG. 4 is a flowchart for illustrating the hair drawing processing.

The processing for hair drawing by the information processing device is explained by referring to the flowchart of FIG. 4. The controller 7 initializes the parameter n specifying a curve (hair) to 0, where n ranges from 0 to $n_{max}$. At step 2, the controller 7 initializes the parameter path indicating the number of times of drawing of the curve corresponding to the parameters n=0 to $n_{max}$ to 1.

At step S3, the data storage unit 1 outputs the coordinate of the control point of the curve corresponding to the parameter n to the curve approximating unit 2 under control by the controller 7.

At step S4, the controller 7 checks whether or not the parameter path is 1. If the parameter path is verified to be 1, the controller 7 moves to step S5.

At step S5, the controller 7 sets the parameter t indicating the position on the curve to 0, while setting the value of the terminal point Te of the curve to be drawn to "tip". That is, the controller 7 sets the portion where the luminance value of the hair is not mixed with the luminance value of the background.

At step S6, the controller 7 checks whether or not the parameter t is equal to the value of the terminal point Te. If the parameter t is verified to be not equal to the value of Te, the controller 7 moves to step S7.

At step S7, the curve approximating unit 2 outputs the coordinate of the Bezier curve to the z-coordinate comparator 3, using the control point coordinate read at step S3 and the parameter t. The controller 7 then increments the parameter t by a pre-set small value Δt (such as $\frac{1}{100}$).

At step S8, the z-coordinate comparator 3 checks whether or not the z-component of the input three-dimensional coordinate is larger than the z-component in the coordinate stored in itself and which has the same z-component as that of the input three-dimensional coordinate. If the input z-component is verified to be smaller than the stored z-component, that is if the input z-component is verified to be smaller than the stored z-component (positioned more backwards), the controller 7 moves to step S9.

At step S9, the reflected light intensity computing unit 4 computes the intensity of the reflected light I of the curve portion associated with the parameter t.

The reflected light intensity computing processing is explained in detail by referring to FIGS. 5 to 8. In computing the intensity of the reflected light, it is assumed that the curve Q associated with the parameter n (hair) is cylindrically shaped, with its cross-section being truly circular, with the diameter of the circle being not larger than one pixel.

The intensity I of the reflected light at an optional point A on the curve Q is computed by the following equation (1):

$$I=Ia+Id+Is \quad (1)$$

where Ia, Id and Is denote the intensity of the ambient light, intensity of the diffused reflected light and the intensity of the reflected light of the mirror surface, respectively. It is assumed that the intensity of the ambient light Ia is constant and pre-set.

Meanwhile, the intensity of the diffused reflected light Id at the optional point A can be found from a normal line vector of the circumference of a cross-section S including the point A. This normal line vector means an optional vector on the cross-section S and cannot be found uniquely. Thus, the intensity of the diffused reflected light Id at the point A is assumed to be an average value of the intensity of the diffused reflected light with respect to the normal line vector of the circumference of the cross-section S in a visible range from the viewing point.

As for the intensity Is of the reflected light of the mirror surface, the normal line vector $Ns_{max}$ which gives the maximum intensity of the reflected light of the mirror surface $Is_{max}$ is used, for the same reason as in the case of the above-mentioned intensity Id of the diffused reflected light.

However, if the intensity of the diffused reflected light is averaged over the visible range, not only is the processing volume increased, but the highlight portion becomes collapsed by averaging. Also, if the light is illuminated on the cylindrical object of a small diameter, it is difficult to recognize the changes in the reflected light along the cylinder diameter, such that it may be retained to be only the portion of the reflected light in the diametral direction having the maximum luminance that is recognized. Thus, in the present embodiment, the normal line vector $Nd_{max}$ which gives the maximum luminance among the reflected light beams in the diametral direction (maximum intensity of the diffused reflected light $Id_{max}$) is used.

As for the intensity Is of the reflected light of the of the mirror surface, the normal line vector $Ns_{max}$ which gives the maximum intensity of the reflected light of the mirror surface $Is_{max}$ is used, for the same reason as in the case of the above-mentioned intensity Id of the diffused reflected light.

Figure 7:
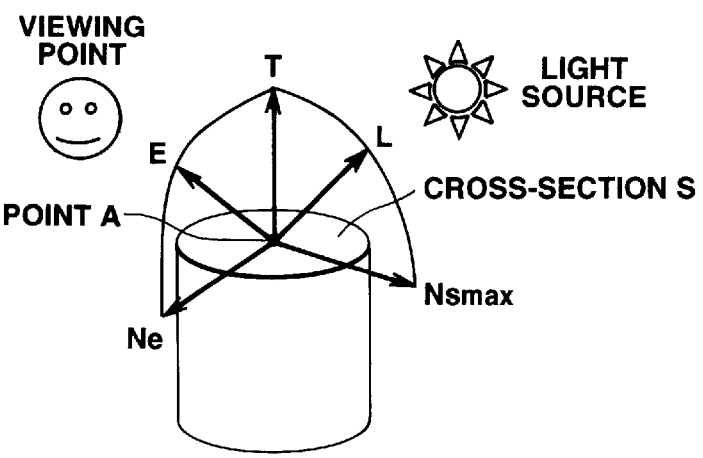
Figure 8:
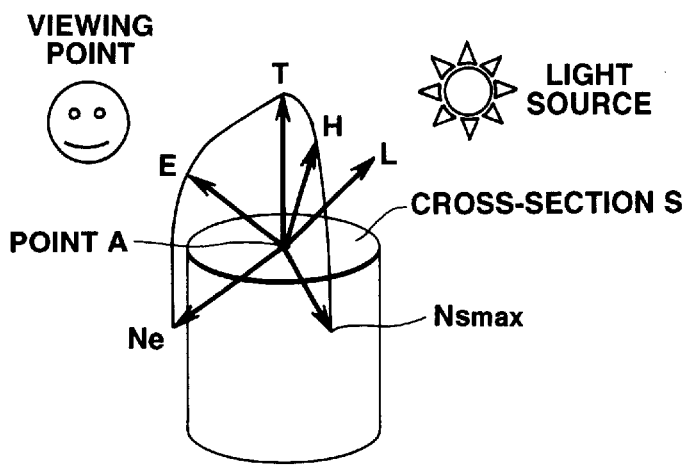

At step S21, the reflected light intensity computing unit 4 finds the normal line vector $Nd_{max}$ which gives the maximum intensity of the reflected light of the mirror surface $Is_{max}$. The normal line vector $Nd_{max}$ is explained with reference to FIG. 7. Referring to FIG. 7, a vector T, referred to below as a tangential vector T, is a normal line vector of the cross-section S passing through the point A (tangential line vector of the curve Q at the point A in FIG. 6). The vector proceeding from the point A towards the viewing point is a line-of-sight vector E and a vector proceeding from the point A towards the light source is the light ray vector L.

According to the Lambert model, details of which are not explained herein, the normal line vector which gives the maximum intensity of the diffused reflected light $Id_{max}$ makes the smallest angle with the light ray vector L. If this is applied to FIG. 7, the normal line vector coincident with the vector corresponding to the light ray vector 1 projected on the cross-section S becomes the normal line vector $Nd_{max}$ which gives the maximum diffused reflected light $Id_{max}$. Therefore, the tangential line vector T, light ray vector L and the normal line vector $Nd_{max}$ lie on the same plane. Returning to FIG. 5, the reflected light intensity computing unit 4 computes, at step S22, the maximum intensity of the diffused reflected light $Id_{max}$ using the normal line vector $Nd_{max}$ found at step S21, in accordance with the following equation (2):

$$Id_{max} = Ii \times Kd(Nd_{max} \cdot L) \qquad (2)$$

where Ii and Kd are the intensity of the incident light and the proportion of the diffused reflected component, respectively, with the respective values being predetermined, and ($Nd_{max} \cdot L$) is the inner product of the normal line vector $Nd_{max}$ and the light ray vector L.

At step S23, the reflected light intensity computing unit 4 computes the inner product of a vector Ne, corresponding to the line-of-sight vector E projected on the cross-section S, and the normal line vector $Nd_{max}$, as the rate of visibility γd indicating to which extent the portion of the circumference of the cross-section S which gives the maximum intensity of the diffused reflected light Idmax is being seen from the viewing point, in accordance with the following equation (3):

$$\gamma d = Ne \cdot Nd_{max} \qquad (3).$$

At step S24, the reflected light intensity computing unit 4 multiplies the maximum intensity of the diffused reflected light $Id_{max}$ with the rate of visibility γd to compute the intensity of the diffused reflected light Id in accordance with the following equation (4):

$$Id = Id_{max} \times \gamma d \qquad (4).$$

At step S25, the reflected light intensity computing unit 4 finds the normal line vector $Ns_{max}$ which gives the maximum intensity of the reflected light from the mirror surface $Is_{max}$. The normal line vector $Ns_{max}$ is explained with reference to FIG. 8. The tangential line vector T, line-of-sight vector E and the light ray vector L are the same as those shown in FIG. 7, and hence are not explained specifically. A vector H is a vector which bisects the angle between the line-of-sight vector E and the light ray vector L.

According to the Phong model, details of which are not explained herein, the normal line vector which gives the maximum intensity of the reflected light from the mirror surface $Is_{max}$ has the smallest angle with respect to the vector H. If this is applied to FIG. 8, the normal line vector coincident with the vector corresponding to the vector H projected on the cross-section S becomes the normal line vector $Ns_{max}$ which gives the maximum intensity of the reflected light from the mirror surface $Is_{max}$. Therefore, the tangential line vector T, vector H and the normal line vector $Ns_{max}$ lie on the same plane.

Figure 5:
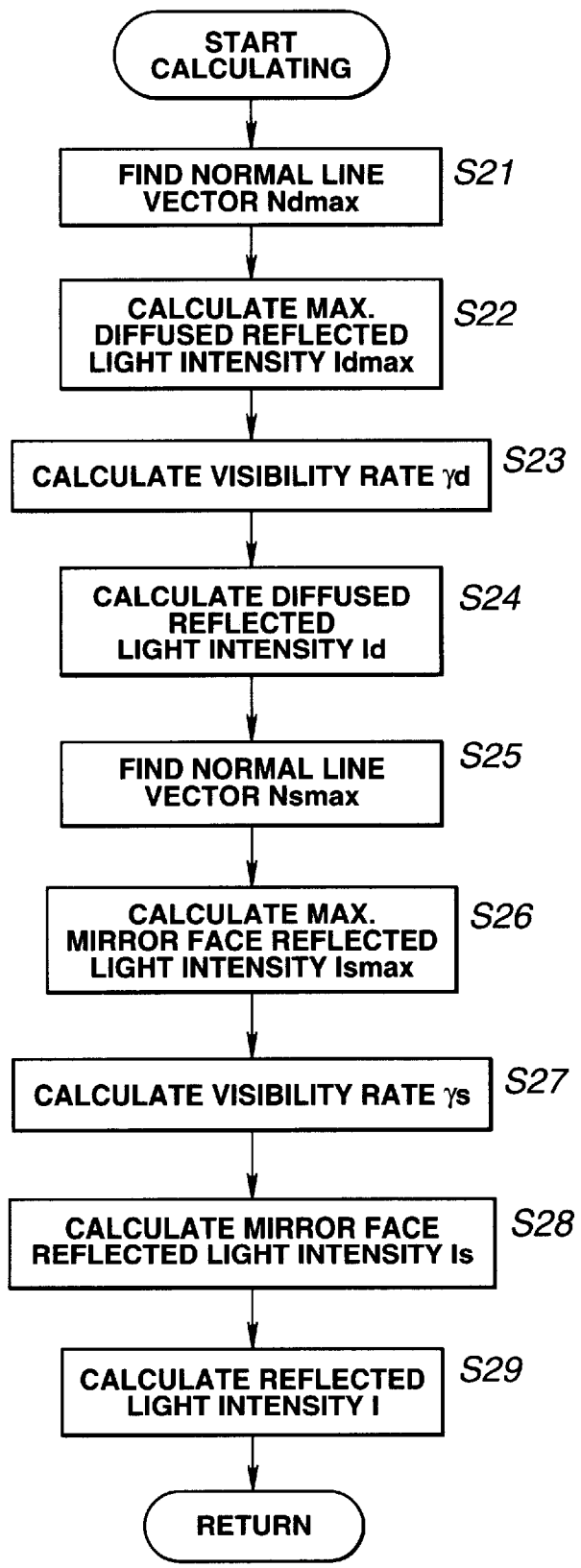
FIG. 5 is a flowchart for illustrating the processing of reflected light intensity computation at step S9 of FIG. 3.
Figure 6:
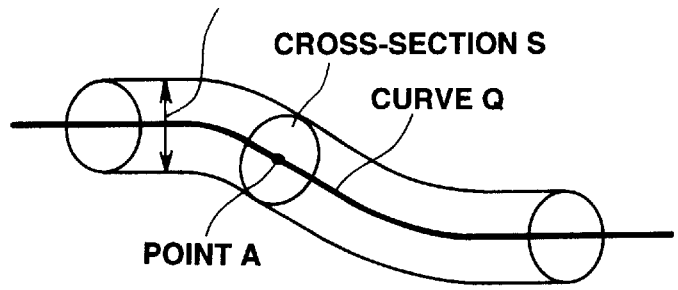
FIGS. 6 to 8 illustrate the processing of reflected light intensity computation.

Reverting to FIG. 5, the reflected light intensity computing unit 4 computes the maximum intensity of the reflected light from the mirror surface $Is_{max}$ in accordance with the following equation (5):

$$Is_{max} = Ii \times Ks(E \cdot Ls_{max}')n \qquad (5)$$

where Ii, Ke and n are the intensity of the incident light, the proportion of the reflected component from the mirror surface, and a parameter specifying the variance of the reflected light from the mirror surface, respectively, with the respective values being predetermined. $Ls_{max}$ is a vector specifying the direction of regular reflection of the incident light from the light source by the normal line vector $Ns_{max}$, respectively. Thus, the normal line vector $Ns_{max}$ bisects the angle between the light ray vector L and the vector $Ls_{max}'$ and ($E \cdot Ls_{max}'$) is an inner product of the line-of-sight vector E and the vector $Ls_{max}'$.

At step S27, the reflected light intensity computing unit 4 computes the inner product of a vector Ne, corresponding to the line-of-sight vector E projected on the cross-section S, and the normal line vector $Ns_{max}$, as the rate of visibility γd indicating to which extent the portion of the circumference of the cross-section S which gives the maximum intensity of the reflected light of the mirror surface $Is_{max}$ is being seen from the viewing point, in accordance with the following equation (6):

$$\gamma s = Ne \cdot Ns_{max} \qquad (6).$$

At step S28, the reflected light intensity computing unit 4 multiplies the maximum intensity of the reflected light of the mirror surface $Is_{max}$ with the rate of visibility γd to compute the intensity of the diffused reflected light Is in accordance with the following equation (7):

$$Is = Is_{max} \times \gamma s \qquad (7).$$

At step S29, the reflected light intensity computing unit 4 substitutes the intensity of the diffused reflected light Id computed at step S24 and the intensity of reflection form the mirror surface Is computed at step S28 into the equation (1) to compute the intensity of the reflected light I.

Figure 3:
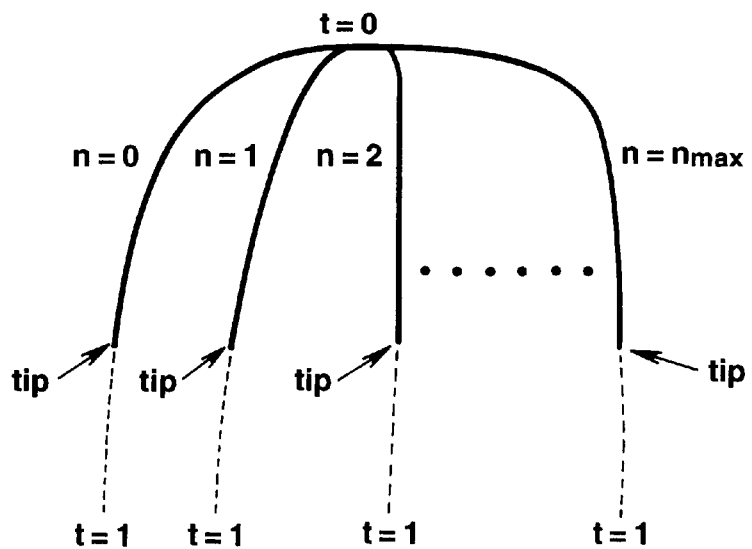
FIG. 3 illustrates positions on a curve.

Reverting to FIG. 3, the controller 7 verifies at step S10 whether or not the parameter path is equal to 2. If the parameter path is verified to be not equal to 2, the reflected light intensity computing unit 4 outputs the computed intensity of the reflected light I to the frame buffer 6, under control by the controller 7.

At step S11, the frame buffer 6 stores the input reflected light intensity I as the luminance value of the position corresponding to the parameter t.

The controller 7 then reverts to step S6 so that the processing of steps S7 to S11 is repeated until the parameter t is verified to be equal to the terminal point Te. This records the luminance value from the root of the curve (hair) to the pre-set position tip in the frame buffer 6. That is, as the portion for which mixing of the luminance value of the hair with the luminance value of the background is not made, the processing of overwriting the value of the frame buffer 6 of the corresponding coordinate with the luminance value of the hair being processed is performed.

If at step S6 the parameter t is verified to be equal to the value of the terminal point Te, the controller 7 moves to step S12. At step S12, the controller 7 verifies whether or not the parameter n is smaller than the maximum value $n_{max}$. If the parameter n is verified to be smaller than the maximum value $n_{max}$, the controller proceeds to step S13. At this step S13, the parameter n is incremented by one. The controller 7 then reverts to step S3 to process the next curve.

The steps S3 to S13 then is repeated to record the luminance values from n=0, that is from the root of the curve to the pre-set position tip, in the frame buffer 6. If the parameter n is found at step S12 to be not smaller than the maximum value $n_{max}$, it is verified that the luminance values from the root to the pre-set position tip have been recorded for the totality of the curves in the frame buffer 6. The controller 7 then moves to step S14.

At step S14, the controller 7 verifies whether or not the parameter path is equal to 2. If the parameter path is verified to be not equal to 2, the controller moves to step S15 to process the portion of the curve from the pre-set position tip to the end of the curve. At step S15, the controller 7 increments the parameter path by 1, that is sets the parameter path to 2. The controller 7 then moves to step S16 where the parameter n is initialized to 0. The controller 7 then reverts to step S3.

At step S3, the data storage unit 1 again executes the above-mentioned processing. Since the parameter path is 2, the parameter path is verified at step S4 not to be 1. The controller moves to step S17.

At step S17, the controller 7 sets the parameter t to tip, while setting the value of Te to 1.

Then, at steps S6 to S9, the above-mentioned processing is executed. At step S10, the parameter path is verified to be 2. The controller moves to step S18.

At this step S18, the reflected light intensity computing unit 4 outputs the computed intensity of the reflected light I to the image synthesis unit 5 under control by the controller 7. The image synthesis unit 5 mixes the luminance value B of the background, supplied from the frame buffer 6, with the intensity of the reflected light I, using a pre-set proportion α (α-blending), as indicated by the following equation (8):

$$R=\alpha I+(1-\alpha)B \quad (8)$$

to output the computed mixed luminance value R to the frame buffer 6. That is, the reflected light intensity computing unit 4 mixes the luminance value of the hair with the luminance value of the background.

In the above equation (8), the proportion α is a function of t and the tip, its value being not less than 0 and not more than 1. For example, if t=tip, α is 1, and is decreased with increase in t, until it becomes equal to 0 for t=1.

At step s11, the frame buffer 6 stores the input mixed luminance value R as the luminance value of the position of the curve associated with the parameter t.

Then, the processing from step S6 through steps S10, S18 and S11 is repeatedly carried out to record the luminance values from the pre-set position tip of the curve to the end (hair end) in the frame buffer 6.

The above-mentioned processing is carried out until the parameter is verified at step S12 to be not smaller than the maximum value $n_{max}$, whereby the luminance values from the pre-set position tip to the end (hair end) are recorded for the totality of curves in the frame buffer 6.

If the parameter n is verified at step S12 to be not smaller than the maximum value $n_{max}$, the controller 7 moves to step S14. At this step S14, the parameter path is verified to be equal to 2, before the controller moves to step S19. At this step S19, the frame buffer 6 outputs the stored luminance value.

Thus, in the present embodiment, the proportion of synthesis is decreased in a direction approaching the distal end of the curve. Using this synthesis proportion, the luminance value of the distal end of the curve is synthesized to the luminance value of the background so that it becomes possible for the curve to be seen as if its thickness is decreased as the distal end of the curve is approached.

Also, in the present embodiment, since the z-coordinate comparator 3 stores the z-coordinate of that point among the points of the three-dimensional coordinates having the same x-component and y-component which is closest to the viewing point, the sequence of the approximation processing (drawing) need not be coincident with the sequence of superposition of these plural curves.

Moreover, since the luminance values from the roots of the totality of curves to the pre-set positions (tip) are computed and stored, and subsequently the luminance values from the pre-set position (tip) of the totality of the curves to the distal ends of the curves are computed and stored, it is possible to evade the inconvenience possibly arising from setting the luminance values of the curves based on the results of comparison of the z-components.

Figure 9:
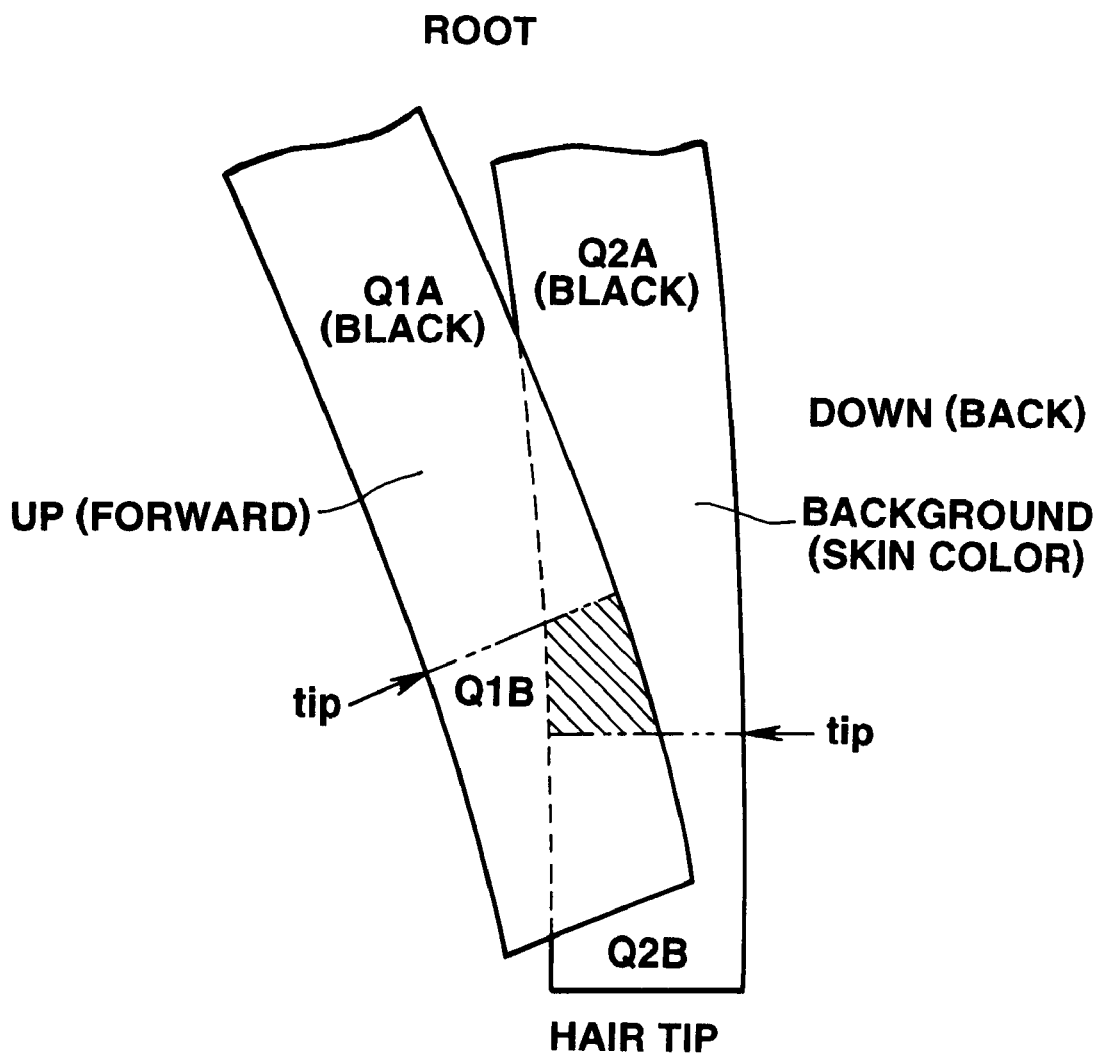
FIG. 9 illustrates the hair drawing processing of the information processing apparatus of FIG. 2.

Specifically, assume that a curve Q1 lying closest to the viewing point, that is on the upper side of the drawing sheet, and a curve Q2 lying on the lower side in the drawing sheet, are processed in a sequence such that a root portion Q1A of the curve Q1 lying on the root side with the tip as the boundary, a hair end portion Q1B of the curve Q1, a root portion Q2A of the curve Q2 lying on the root side with the tip as the boundary, and a hair end portion Q2B, are processed in this sequence. In the shaded portion of FIG. 9, the background for the curve Q1 is the curve Q2. Therefore, the color of the shaded portion is the hair color, such as black. However, if the hair end portion Q1B is processed first, it is mixed with the background color, such as with the skin color. However, in the present embodiment, since the distal end portions Q1B, Q2B are processed after processing the root portions Q1A, Q2A of the curves, the root portion Q2A is already present in the frame buffer 6 when the hair end portion Q1B is processed, thus evading the above-mentioned inconvenience.

The curve approximating unit 2 generates a Bezier curve from the coordinate of the control point. Alternatively, a B-spline curve may also be generated from the coordinate of the control point.

Figure 10:
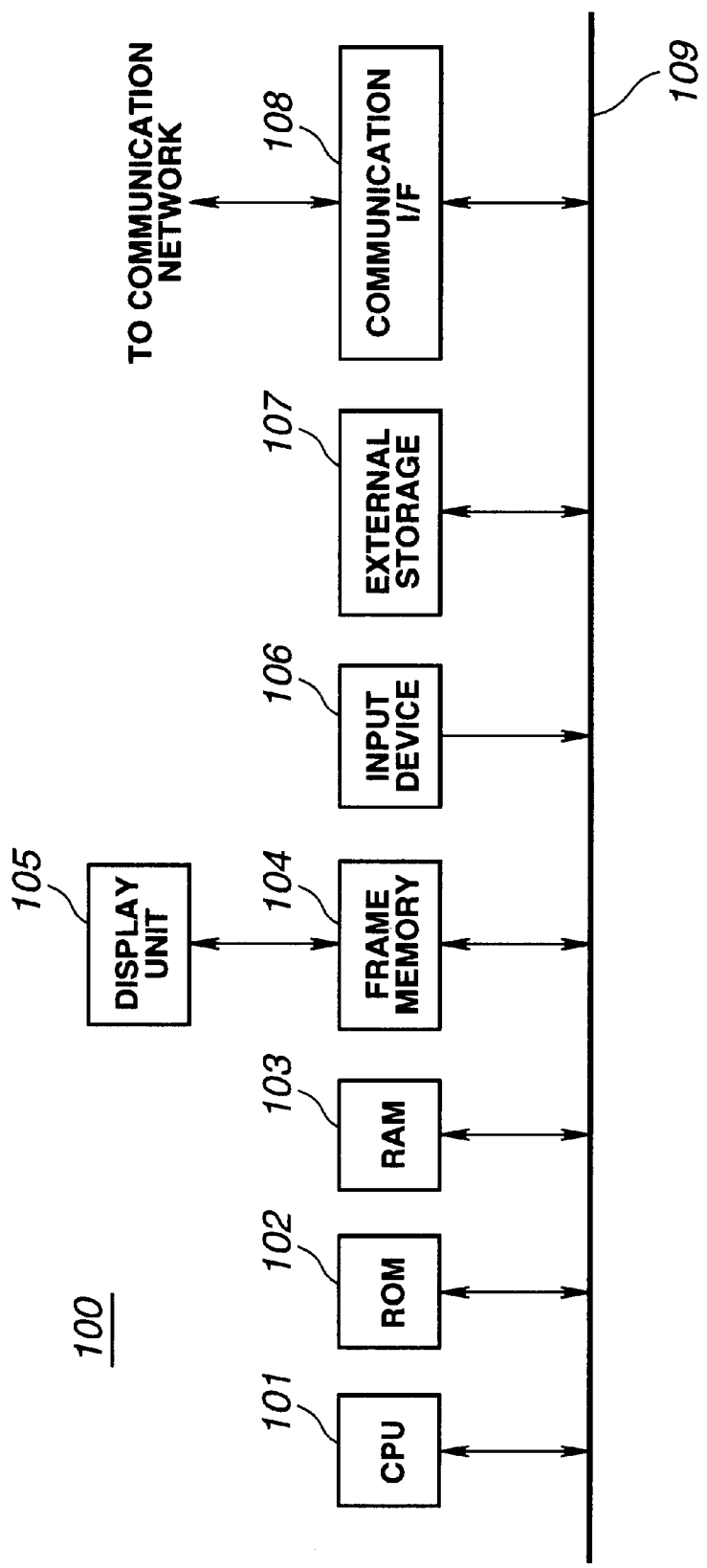
FIG. 10 illustrates a hardware structure for realization of hair drawing processing by software.

Referring to FIG. 10, the hardware structure of an information processing device in the event of executing the processing of FIGS. 2 to 9 by software is explained in detail.

Referring to FIG. 10, an information processing device 100 includes a central processing unit (CPU) 100 for executing the processing program, a read-only memory (ROM) 101 for storing the processing program for FIGS. 4 and 5, a random access memory (RAM) 103 for transient storage of processing data, a frame memory 104 for storage of the luminance values calculated by the processing program, a display unit 105 for displaying an image made up of luminance values stored in the frame memory 104, and an input unit 106 such as a mouse and a keyboard. The information processing device 100 also includes an external storage unit 107 for storage of the information on the control point of a curve, image data of the background and an image obtained on hair synthesis and a communication interface (I/F) for connection to a communications network for exchanging the information with an external terminal device. There is also provided a bus 109 interconnecting the respective circuits for transmitting programs or data.

The external storage unit 107 is a random-accessible information recording medium, such as a magnetic disc or an optical disc. The display unit 105 is able to display multiple windows and to display plural images simultaneously.

The processing program of the present embodiment is adapted to be stored in the ROM 102. Alternatively, it may be stored in the external storage unit 107 and may be transferred via the bus 109 to the RAM 103 for execution by the CPU 101. The processing program may also be adapted to be received over the communications network from the external terminal device to the communication interface 108 and stored in the RAM 103 or in the external storage unit 107 for execution subsequently in the CPU 101.

That is, the computer program that performs the above respective processing operations can be provided as a providing medium, such as a magnetic disc, a CD-ROM or the like information recording medium, but also as a network providing medium, such as Internet or a digital satellite.

In the present embodiment, as described above, since a portion of a line is specified, luminance values of the line are computed and luminance values of a portion of the line thus computed are synthesized with luminance values of the background, it becomes possible to suppress the lowering of the massy feeling of the distal end of a hair.

What is claimed is:

1. An information processing apparatus for drawing a filamentary object, comprising:

means for storing a plurality of control points;

means for generating lines from said control points stored in said storage means;

means for specifying first and second portions of said lines generated by said generating means;

means for computing luminance values for said first and second line portions specified by said specifying means; and means for synthesizing luminance values of the second line portions computed by said computing means and luminance values of a background; and means for storing said luminance values of said first line portions computed by said computing means and said synthesized luminance values of said second line portions and the luminance values of the background.

2. The information processing apparatus according to claim 1 further comprising:

means for comparing z-components of coordinates of said line generated by said generating means.

3. The information processing apparatus according to claim 1 wherein said synthesizing means synthesizes the luminance values using a pre-set synthesis ratio.

4. The information processing apparatus according to claim 3 wherein said pre-set synthesis ratio is a function of positions on said line.

5. The information processing apparatus according to claim 1 wherein said generating means generates a Bezier curve.

6. The information processing apparatus according to claim 1 wherein said generating means generates a B-spline curve.

7. An information processing method for drawing a filamentary object, comprising:

a step for generating lines from a plurality of control points;

a step for specifying first and second portions of said lines generated by said generating step;

a step for computing luminance values for said first and second line portions specified by said specifying step;

a step for storing the luminance values for said first line portions;

a step for synthesizing luminance values of the second line portions computed by said computing step and luminance values of a background; and a step for storing the synthesized luminance values of the second line portions and the background.

8. The information processing method according to claim 7 further comprising:

a step for comparing z-components of coordinates of said line generated by said generating step.

9. The information processing method according to claim 7 wherein said synthesizing step synthesizes the luminance values using a pre-set synthesis ratio.

10. The information processing method according to claim 9 wherein said pre-set synthesis ratio is a function of positions on said line.

11. The information processing method according to claim 7 wherein said generating step generates a Bezier curve.

12. The information processing method according to claim 7 wherein said generating step generates a B-sline curve.

13. A providing medium for providing to an information processing apparatus for drawing a filamentary object a program designed to permit execution of processing comprising:

a step for generating lines from a plurality of control points;

a step for specifying first and second portions of said lines generated by said generating step;

a step for computing luminance values for said first and second line portions specified by said specifying step;

a step for storing the luminance values for said first line portions;

a step for synthesizing luminance values of the second line portions computed by said computing step and luminance values of a background; and a step for storing the synthesized luminance values of the second line portions and the background.

* * * * *